United States Patent [19]

Kralles et al.

[11] Patent Number: 5,055,874
[45] Date of Patent: Oct. 8, 1991

[54] FILM FLATTENING APPARATUS AND METHOD

[75] Inventors: Christopher J. Kralles; Michael T. Wolf, both of Rochester, N.Y.

[73] Assignee: Eastman Kodak Company, Rochester, N.Y.

[21] Appl. No.: 592,208

[22] Filed: Oct. 3, 1990

[51] Int. Cl.$^5$ ............................................. G03B 27/62
[52] U.S. Cl. ...................................... 355/76; 355/224
[58] Field of Search .................... 355/75, 76, 77, 133; 352/226, 224; 354/276

[56] References Cited

U.S. PATENT DOCUMENTS

| | | | |
|---|---|---|---|
| 3,132,560 | 5/1964 | Pignone et al. | 354/276 |
| 4,094,603 | 6/1978 | Evers | 352/224 |
| 4,736,228 | 4/1988 | Ito | 355/75 |
| 4,761,675 | 8/1988 | Sawataki | 355/76 |

*Primary Examiner*—L. T. Hix
*Assistant Examiner*—D. Rutledge

[57] ABSTRACT

Film flattening apparatus and method wherein a base (30) having a flat surface (32) contacts the film (12) as it moves thereacross in a given direction, the surface having an aperture (34) defined therein, respective portions (50, 52) of the base (30) in the vicinity of the aperture lateral edges (36, 38) define film contacting surfaces (54, 56) each having curvature sufficient to provide lateral column strength in the film as it is moved thereabove, and flattener elements (90) substantially near the aperture longitudinal edges (40, 42) apply edge flattening force to the edges of the film outwardly of the aperture longitudinal edges. Edge guides (110) contact opposite edges of the film in the vicinity of one of the base portions (50, 52), and first and second deflectors (270, 272) can be provided adjacent corresponding ones of the base portions (50, 52) for deflecting film along a serpentine path. An optical film notch detector (390, 392) can be operatively associated with one of the base portions (50, 52).

36 Claims, 10 Drawing Sheets

FILM FLATTENING APPARATUS AND METHOD

BACKGROUND OF THE INVENTION

This invention relates to the art of film flattening and handling, and more particularly to a new and improved film flattening apparatus and method.

One area of use of the present invention is in photofinishing apparatus such as high speed photographic printers, although the principles of the present invention can be variously applied. Conventional intermittent contact film web flattening changes require clamp actuation and settling time, which can impose a limitation on high speed photographic printer operation.

SUMMARY OF THE INVENTION

It is, therefore, a primary object of the present invention to provide a new and improved film flattening apparatus and method.

It is a more particular object of this invention to provide such apparatus and method having higher speed of operation.

The present invention provides film flattening apparatus and method wherein a base having a flat surface contacts the film as it moves thereacross in a given direction, the surface having an aperture defined therein, respective means in the vicinity of the aperture lateral edges define film contacting surfaces each having curvature sufficient to provide lateral column strength in the film as it is moved thereover, and means substantially near the aperture longitudinal edges apply edge flattening force to the edges of the film outwardly of the aperture longitudinal edges. Edge guide means contact opposite edges of the film in the vicinity of the means defining film contacting surfaces, and first and second deflector means can be provided adjacent corresponding ones of the means defining film contacting surfaces for deflecting film along a serpentine path. Optical film notch detecting means can be operatively associated with the means defining film contacting surfaces.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENTS

Figure 1:
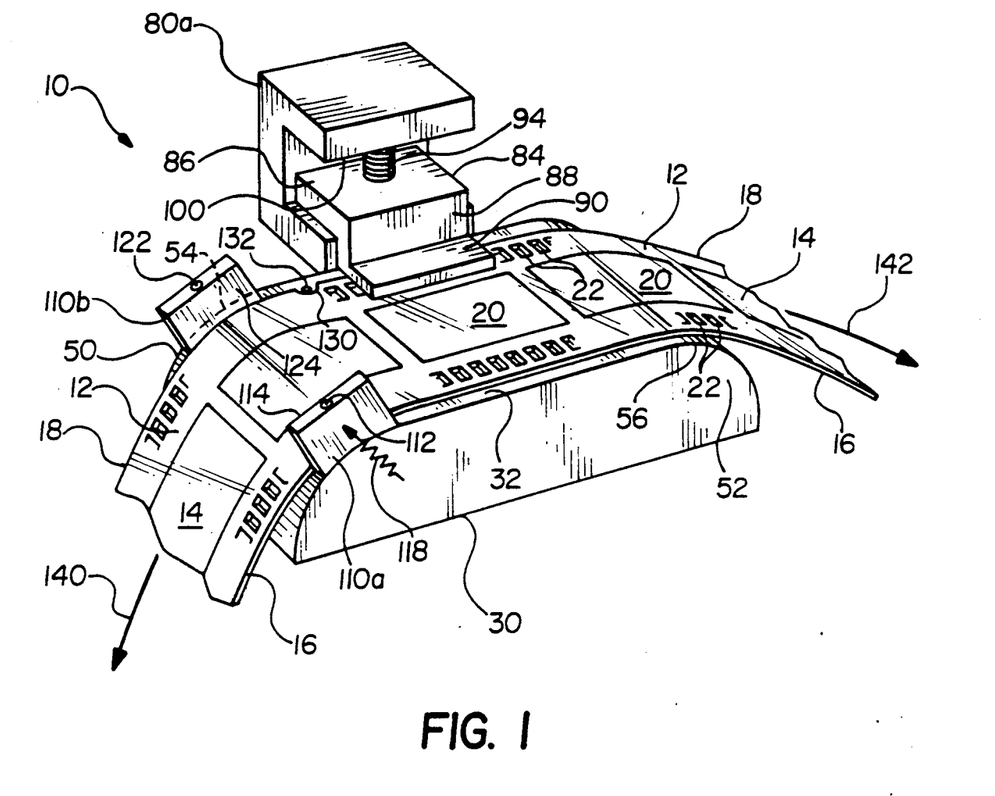
FIG. 1 is a diagrammatic perspective view illustrating the method and apparatus of one embodiment of the present invention.
Figure 2:
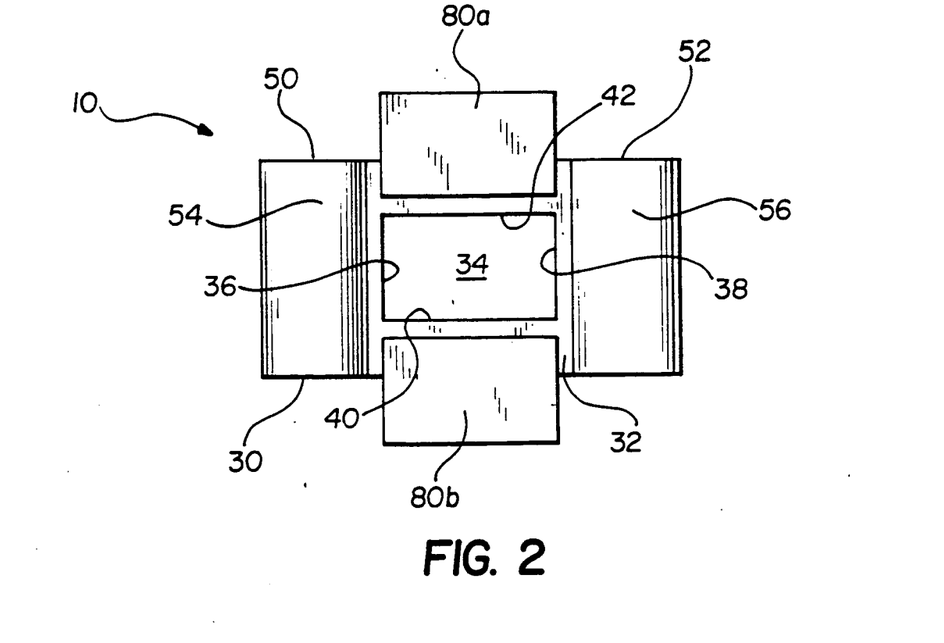
FIG. 2 is a diagrammatic top plan view of the apparatus of FIG. 1 with parts removed.
Figure 3:
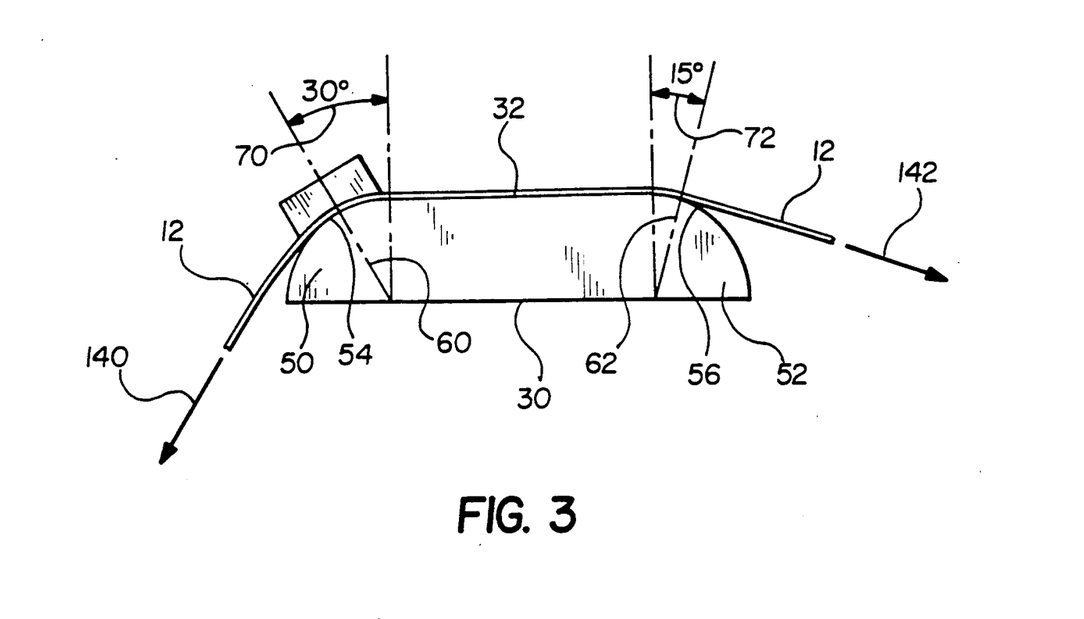
FIG. 3 is a diagrammatic view illustrating the operation of FIGS. 1 and 2.
Figure 4:
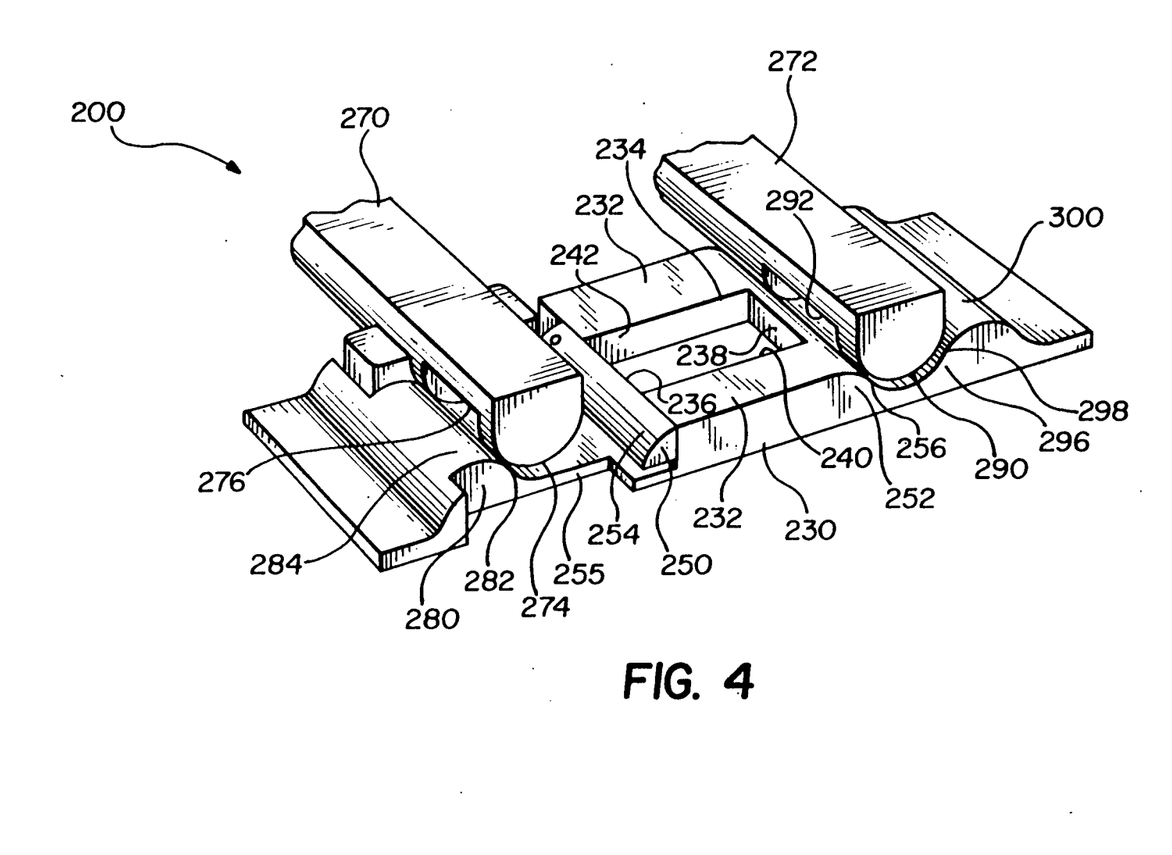
FIG. 4 is a diagrammatic perspective view with parts removed of apparatus according to another embodiment.

FIGS. 1-3 illustrates a basic film flattening apparatus 10 according to the present invention. Apparatus 10 is illustrated for use with photographic film 12 comprising a thin web 14 having spaced substantially parallel longitudinal edges 16 and 18. Film 12 includes a series of frames 20, such as images on a photographic negative, at spaced locations therealong, and film 12 is provided with spaced perforations 22 along rows adjacent edges 16,18 for engagement with film moving mechanisms as is well-known.

The apparatus 10 comprises a base 30 having a flat surface 32, shown in further detail in FIGS. 2 and 3, adapted to contact film 12 as it moves therealong in a given direction, for example from left to right as viewed in FIG. 1. An aperture 34 is defined in base 30, open to flat surface 32, and includes spaced apart lateral edges 36,38 disposed substantially perpendicular to the direction of travel of film 12 and spaced apart longitudinal edges 40,42 joining lateral edges 36,38 and disposed substantially parallel to the direction of travel of film 12. The arrangement allows the respective opposite edges 16,18 of film 12 to lie outwardly of the aperture longitudinal edges 40,42. In an illustrative apparatus, aperture 34 is the film exposure aperture in photofinishing apparatus such as a photographic printer.

In accordance with the present invention, apparatus 10 comprises respective means 50 and 52 in the vicinity of the aperture lateral edges 36 and 38 for defining film contacting surfaces 54 and 56 each having curvature sufficient to provide lateral column strength in the film 12 as it is moved over the curved surfaces 54,56 in the direction of film travel, for example from left to right as viewed in FIG. 1.

In particular, film 12 when in an unconstrained condition has a relatively low lateral column strength and is susceptible to curling at the lateral edges 16,18. Furthermore, the nature of film 12 is such that it can bend only in one direction at a time, i.e. either laterally or longitudinally but not both simultaneously. Accordingly, the apparatus of the present invention bends or curves film along a path defined by a radius disposed in a plane substantially parallel to the longitudinal axis of film 12, the longitudinal axis being disposed parallel to the direction of movement of film 12 in apparatus 10. This bending or curving of film 12 in the longitudinal direction provides a relatively high lateral column strength in film 12 thereby preventing lateral curling at edges 16,18.

In the illustrative apparatus shown in FIGS. 1-3, the surface defining means 50 and 52 are integral extensions of the body of base 30 and are shaped to define the curved surfaces 54 and 56. In particular, means 50 is located adjacent lateral aperture edge 36 and defines surface 54 in terms of a radius designated 60 in FIG. 3 disposed in a plane substantially parallel to the direction of movement of film 12. Similarly, means 52 is located adjacent lateral aperture edge 36 and defines surface 56 in terms of a radius designated 62 in FIG. 3 disposed in a plane substantially parallel to the direction of movement of film 12. In accordance with the present invention, each of the radii 60,62 is of a length sufficient to maximize lateral film flatness while minimizing longitudinal film bow. As will be described in further detail in connection with another embodiment of the invention, when apparatus 10 is used with standard 35 mm photographic film, each radius 60,62 preferably is about 1.0 inch in length.

As shown in FIG. 3, film 12 contacts surfaces 54 and 56 along different degrees or extents of the surface curvature. This degree or extent of contact will be referred to herein as a wrap angle In the embodiment of FIGS. 1-3, film 12 contacts curved surface 54 over or along a wrap angle 70 of about 30° extending from aperture lateral edge 36. This relatively larger wrap angle 70 provides sufficient lateral column strength for film 12 as it approaches the flat surface 32 and aperture 34 where it receives an applied flattening force as will be described. Wrap angle 70 also can provide sufficient lateral column strength for edge guiding of film 12 in this vicinity as will be described. Film 12 contacts curved surface 56 over or along a wrap angle 72 of about 15° extending from aperture lateral edge 38. This relatively smaller wrap angle 72 provides sufficient lateral column strength for film 12 as it leaves the flattening apparatus 10.

The wrap angle is a function of film thickness which involves beam strength and the wrap angle also is a function of film stiffness which involves bending modulus. For example, as film thickness decreases the wrap angle should be increased, and as the thickness increases the wrap angle should be decreased. As film stiffness decreases the wrap angle should be increased, and as the stiffness increases the wrap angle should be decreased. The foregoing wrap angles 70 and 72 of 30° and 15°, respectively, are considered optimum for use of the apparatus of FIGS. 1-3 with standard 35 mm photographic film.

The apparatus 10 of the present invention further comprises means 80 substantially near the aperture longitudinal edges 40,42 for applying edge flattening force to the edges of film 12 outwardly of the aperture longitudinal edges. As indicated in FIG. 2, the apparatus includes a pair of force applying means 80a,80b in spaced apart, laterally opposed relation near aperture 34. Only one of the force applying means 80a is shown in detail in FIG. 1 for convenience in illustration. It is understood that the other force applying means 80b is identical in structure and operation to force applying means 80a, and this will be apparent from the subsequent description of another embodiment of the present invention.

As shown in FIG. 1, force applying means 80a comprises means in the form of a flattener element 84 for contacting film at a location adjacent film edge 18 and outwardly of the aperture longitudinal edge 42. Flattener 84 comprises a main body portion 86, a depending flange portion 88 and a foot portion 90 extending from flange portion 88. Foot portion 90 is disposed substantially parallel to surface 32 and is adapted to contact film 12 at the location described above and apply longitudinal flattening force thereto. Force applying means 80b includes an identical flattener element, and the elements of means 80a,80b contact film 12 at laterally opposite locations adjacent the film edges 16,18 and outwardly of the aperture longitudinal edges 40,42.

Force applying means 80a further comprises means for applying film flattening force to the film contacting means 84. For use with standard 35 mm photographic film, the force applying means is in the form of a compression spring 94 which applies a continuous longitudinal edge flattening force of eight ounces to film 12. One end of spring 94 contacts flattener body portion 86 and the other end is held in a fixed bracket or support 98 which is fixedly mounted to an appropriate supporting surface, such as a surface of base 30.

Force applying means 80a further comprises means 100 for mounting film contacting means 84 for limited movement in two directions about axes substantially parallel to and perpendicular to the direction of movement along surface 32 to accommodate variations in thickness of film 12 as it passes between surface 32 and foot portion 90. The afore-mentioned axes are substantially orthogonal and disposed in a plane parallel to surface 12. The means 100 provides a universal or ball joint type mounting of film contacting means 84 and the result is a limited degree of wobble type or wave-like movement of foot portion 90. Means 100 can be provided by various arrangements, such as a countersink hole in body 86 receiving the spherical tip of a set screw extending from bracket 98, and this will be described in further detail in connection with another embodiment of the invention.

The apparatus 10 further comprises edge guide means 110 for contacting the opposite edges 16, 18 of film 12 in the vicinity of the curved surface defining means 50. One purpose of the edge guide means 110 is to insure proper lateral alignment of film 12 as it moves along flat surface and over aperture 34. In high speed photofinishing apparatus it is important that the film frames 20 each be in proper lateral alignment over aperture 34. Longitudinal alignment is maintained by the film driving mechanisms which engage the film 12 in a known manner. Another purpose of edge guide means 110 is to provide accurate and repeatable lateral film notch detection as will be described. In the apparatus shown, edge guide means 110 comprises a pair of edge guide elements 110a and 110b for contacting corresponding areas of film edges 16 and 18, respectively. In particular, edge guide 110a is mounted on base 30 by suitable means (not shown) in the vicinity of curved surface defining means 50 and for pivotal movement about an axis 112 disposed substantially perpendicular to surface 32. Edge guide 110 has an operative surface 114, in particular flat or planar, located for guiding contact with film edge 16. In addition, edge guide 110a also is mounted for lateral movement toward and away from film edge 16 and is urged toward edge 16 by force applying means in the form of spring 118. In apparatus 10 used with standard 35 mm photographic film, spring 118 is a flat rate torsion spring supplying a constant load of six ounces at the film edge. Similarly, edge guide 110b is mounted on base 30 by suitable means (not shown) in the vicinity of curved surface defining means and in substantial lateral alignment or registry with edge guide 110a. Edge guide 110b is mounted for pivotal movement about an axis 122 disposed substantially perpendicular to surface 32. Edge guide 110b has an operative surface 124, in particular flat or planar, located for guiding contact with film edge 18. In the apparatus shown, edge guide 110b is not mounted for lateral movement.

For proper operation of edge guides 110a, 110b it is important that film 12 be maintained flat as it moves between guides 110a, 110b. As previously mentioned, the unconstrained film web 14 has a relatively low lateral column strength and therefore is susceptible to curling at lateral edge guides under relatively low loads. In the apparatus of the present invention, film web 14 is curved over the wrap angle of surface 54, in particular the 30° wrap angle 70, to provide relatively high lateral column strength at the lateral edge guides 110a, 110b. As a result, curling of film 12 at edge guides 110a, 110b is prevented As previously described, another purpose of edge guides 110a, 110b is to provide accurate and repeatable lateral film notch detection. Film 12 typically will have notches at spaced locations along one edge, the notch locations providing information relative to frames 20. For convenience in illustration, one notch 130 is shown in film edge 18 in FIG. 1. In accordance with another aspect of the present invention, apparatus 10 includes optical film notch detecting means operatively associated with curved surface defining means 50. As shown in FIG. 1, the optical detector is located in an aperture 132 provided in surface 54 and located to be in registry with notches in film edge 16 as they move thereacross. Thus, notch 130 is shown in FIG. 1 in registry with aperture 132 Accordingly, proper operation of edge guides 110a, 110b insures that edge 16 at notches therein pass in proper registry with detector aperture 132. Furthermore, locating aperture 132 in surface 54 insures that the film web 14 is repeatedly registered at the focal length distance of the optical sensor. This will be described in further detail in connection with another embodiment of the present invention.

While aperture 34 is rectangular in the illustrative apparatus of FIGS. 1-3, other aperture shapes or configurations can be employed. While apparatus 10 has been described in connection with photofinishing apparatus, such as high speed photographic printers, it can find use in other photographic apparatus. Examples include moving optics systems such as in microfilming, as well as in check recording devices.

In operation, film 12 is moved through apparatus 10 by appropriate drive mechanisms which engage film 12 in a known manner. In photofinishing apparatus, the movement is intermittent whereby each frame 20 is placed momentarily in the field of aperture 34. During such movement, tension forces act on film 12 in the directions indicated by arrows 140, 142 in FIGS. 1 and 3. Assuming film 12 moves from left to right in FIGS. 1-3, the film 12 is bent in the vicinity of the aperture lateral edges 36, 38 and outwardly of flat surface 32 in a manner providing lateral column strength in film 12. Bending of film 12 comprises moving it along and in contact with curved surfaces 54 and 56. Edge flattening force is applied to the edges of film 12 on flat surface 32 and outwardly of the aperture longitudinal edges 40, 42. The edge flattening force is applied when film 12 is contacted by the force applying means 80. As a result, film 12 is maintained in a flat condition in the region of aperture 34.

Four edge film flatness on surface 32 around aperture 34 is achieved by the method and apparatus of the present invention which employs a radiused surface profile, i.e. curved surfaces 54 and 56, immediately before and after the aperture 34 to induce lateral column strength in the film web. The radii 60 and 62 associated with surfaces 54 and 56 are selected at one inch in length to maximize lateral film flatness while minimizing longitudinal film bow. Force applying means 80a, 80b apply a continuous longitudinal edge flattening force to film 12 adjacent aperture longitudinal edges 40, 42. The flatteners of force applying means 80a, 80b deflect with a wave-like motion to accommodate variations in film thickness, including spliced sections of film.

When utilized in a high speed photographic printer, the apparatus and method of the present invention achieves increased productivity and reliable film notch detection. Printer productivity is increased by eliminating the conventional four edge intermittent contact film web flattening clamp and replacing it with the continuous contact tension apparatus of the present invention. The total print exposure cycle time in a high speed photographic printer is reduced by eliminating the need for clamp actuation and settling time. Accordingly, the apparatus of the present invention provides faster operation. Reliable film notch detection is achieved by accurate and repeatable lateral film registration. This, in turn, results from bending or curving the film web to provide high lateral column strength in the film thus eliminating film curling at the edge guides. Having optical sensing means associated with the curved surface contacted by the film optimizes optical film notch detection.

FIGS. 4-13 illustrate film flattening apparatus 200 according to another embodiment of the present invention. Apparatus 200 is particularly suitable for use in photofinishing apparatus wherein the film enters and leaves along paths disposed in substantially the same plane as that of the exposure aperture. One illustrative example of such photofinishing apparatus is a high speed photographic printer commercially available from Eastman Kodak Company under the designation CLAS 35 Color Printer.

Apparatus 200 is for use with photographic film 212 similar to film 12 of the previous embodiment and including a thin web 214, edges 216, 218, frames 220, perforations 222 and which is provided with spaced notches 224 along edge 218. Apparatus 200 includes a base 230 having a flat surface 232 for contacting film 212 as it moves therealong, and an aperture 234 is defined in base 230, aperture flat surface 232, and includes spaced apart lateral edges 236, 238 and spaced apart longitudinal edges 240, 242 joining the lateral edges 236, 238. The arrangement allows the respective opposite edges 216, 218 of film 212 to lie outwardly of the aperture longitudinal edges of 240, 242 when film 212 moves along surface 232 Aperture 234 is the film exposure aperture in the above-mentioned photofinishing apparatus.

Figure 7:
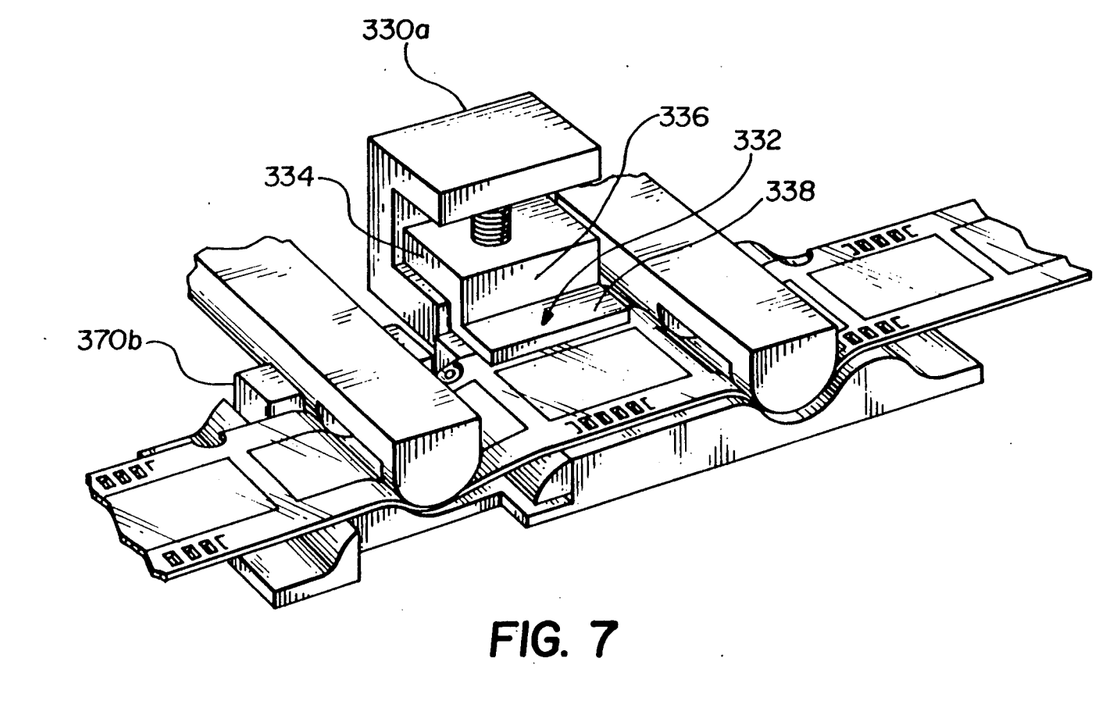
FIG. 7 is a view similar to FIG. 5 showing the force applying means.
Figure 8:
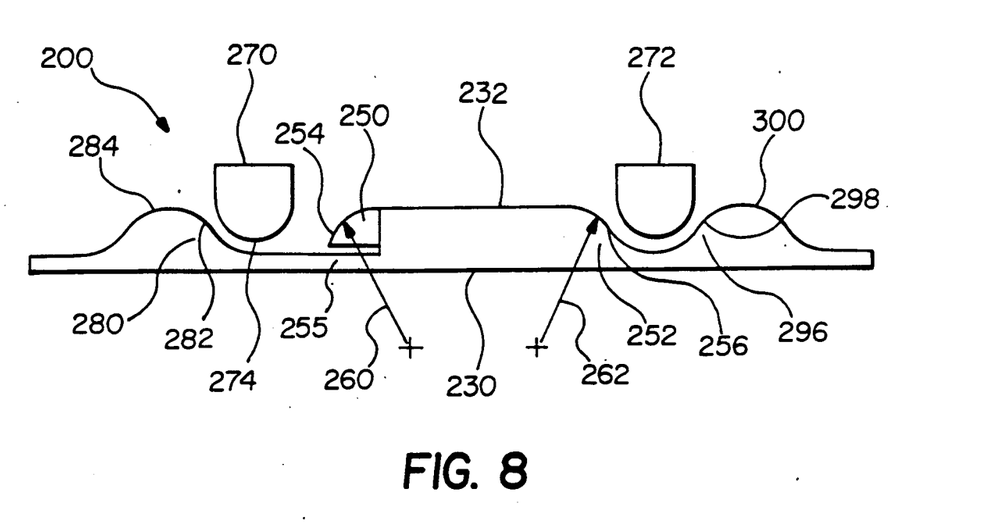
FIGS. 8 and 9 are diagrammatic views illustrating the operation of the apparatus of FIGS. 4-7.

In this embodiment, there is provided means 250 separate from but adjacent to base 230 for defining curved film contacting surface 254. Means 250 is a barlike element abutting an end surface of base 230 and in the apparatus shown a flat side surface of element 250 defines aperture lateral edge 236. Element 250 is supported on a surface of an extension 255 of base 230 and is mounted for a limited degree of lateral movement by an arrangement which will be described. There is also provided means 252 in the form of an integral extension of base 230 adjacent aperture lateral edge 238 for defining curved film contacting surface 256. As in the previous embodiment, film contacting surfaces 254, 256 each have curvature sufficient to provide lateral column strength in film 212 as it is moved over the curved surfaces 254, 256 in the direction of film travel, for example from left to right as viewed in FIGS. 4-7. As illustrated in FIG. 8, means 250 defines surface 254 in terms of a radius 260 disposed in a plane substantially parallel to the direction of movement of film 212. Similarly, means 252 defines surface 256 in terms of a radius 262 disposed in a plane substantially parallel to the direction of film 212. Each of the radii 260, 262 is of a length sufficient to maximize lateral film flatness while minimizing longitudinal film bow. When apparatus 200 is used in the afore-mentioned photographic printer with standard 35 mm photographic film, optimum results occur with one inch radii 260, 262.

Figure 5:
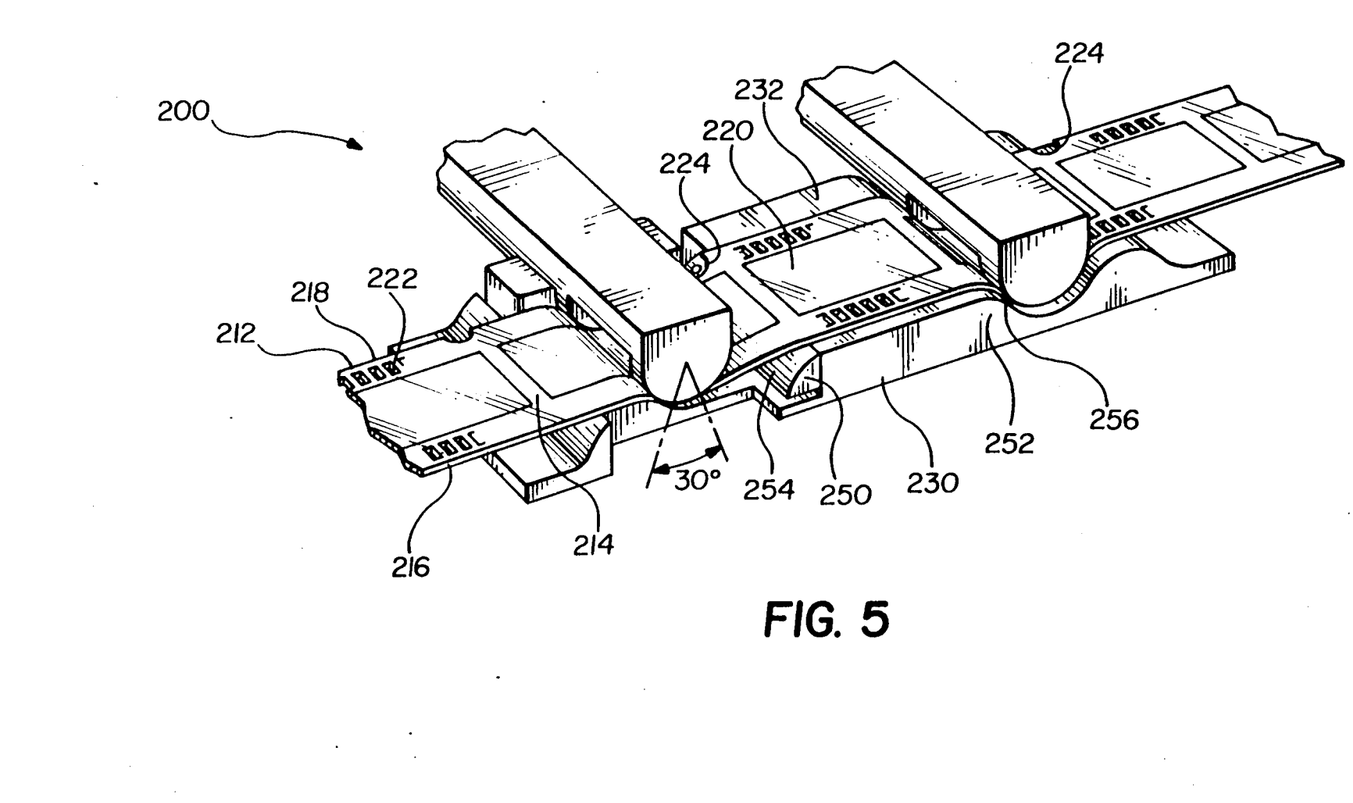
FIG. 5 is a view similar to FIG. 4 but including film.
Figure 6:
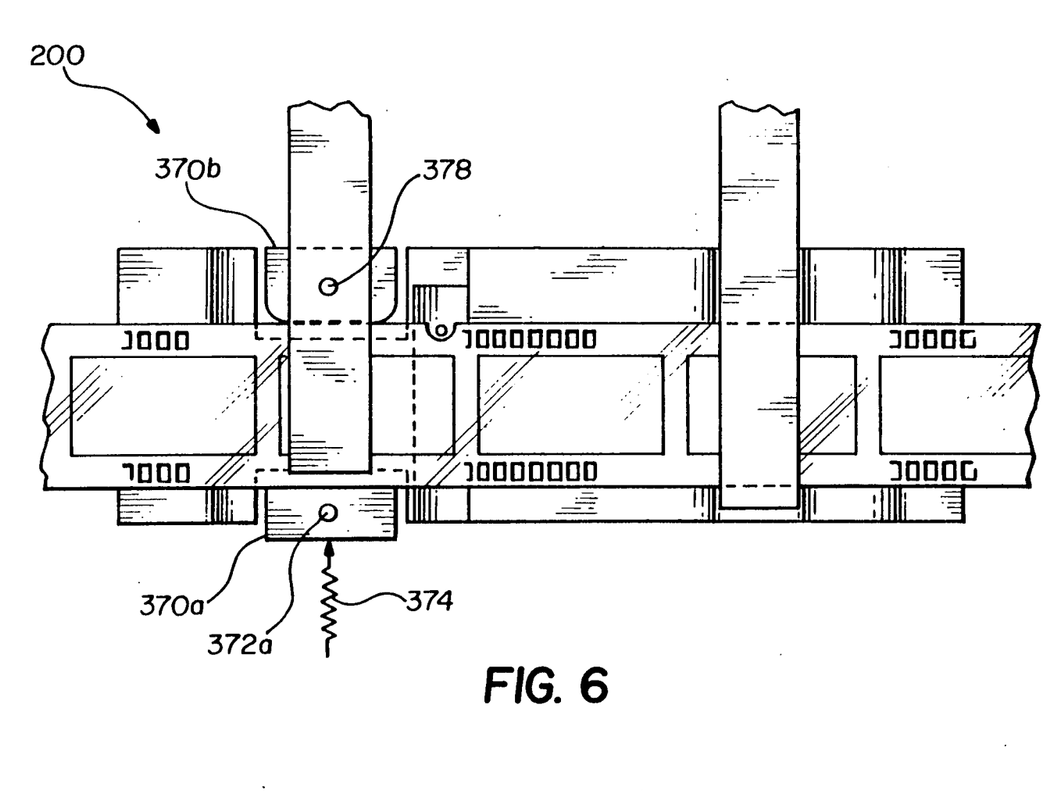
FIG. 6 is a top plan view thereof.

In accordance with this embodiment of the present invention, apparatus 200 further comprises first and second film deflector means 270 and 272, respectively. In particular, film deflector means 270 is located adjacent means 250 for deflecting film along a serpentine path as illustrated in FIG. 5 from a location spaced from aperture 234 along curved surface 254 and along flat surface 232. Film deflector means 270 is in the form of an elongated bar, disposed laterally relative to the direction of movement of film 212, and is provided with a curved surface 274 adapted to contact film 212. Surface 274 is relieved in the region designated 276 so as to contact film 212 laterally outwardly of the frames 220. Surface 274 contacts the surface of film 212 opposite the film surface contacted by curved surface 254.

The extension 255 of base 230 includes a planar portion on which element 250 rests and the extension meets a body portion 280 which defines a curved surface 282. Thus, body portion 280 comprises curved surface defining means located outwardly of deflector means 270 in a direction away from aperture lateral edge 236. Body portion 280 defines curved surface 282 in terms of a radius disposed in a plane parallel to the direction of travel of film 212. Curved surface 282 faces toward and co-operates with the curved surface 274 of deflector 270 for guiding film 212 along the afore-mentioned respective path. Curved surface 282 terminates at a film-supporting surface 284 which is disposed in substantially the same plane as surface 232.

Film deflector means 272 is located adjacent means 252 for deflecting film along a serpentine path as illustrated in FIG. 5 from along flat surface 232, along curved surface 256 to a location spaced outwardly from aperture 234. Film deflector means 272 likewise is in the form of an elongated bar, disposed laterally relative to the direction of movement of film 212, and is provided with a curved surface 290 adapted to contact film 212. Surface 290 is relieved in the region designated 292 so as to contact film 212 laterally outwardly of the frames 220. Surface 290 likewise contacts the surface of film 212 opposite the film surface contacted by curved surface 256.

The integral extension of base 230 which provides means 252 continues outwardly to define a curved, trough-like region generally receiving the curved surface 290 of deflector 272 and continues further outwardly to a body portion 296 which defines a curved surface 298. Thus, body portion 296 comprises curved surface defining means located outwardly of deflector means 272 in a direction away from aperture lateral edge 238. Body portion 296 defines curved surface 298 in terms of a radius disposed in a plane parallel to the direction of travel of film 212. Curved surface 298 faces toward and co-operates with the curved surface 290 of deflector 272 for guiding film 212 along the afore-mentioned respective path. Curved surface 298 terminates at a film supporting surface 300 which is disposed in substantially the same plane as surface 232.

Figure 9:
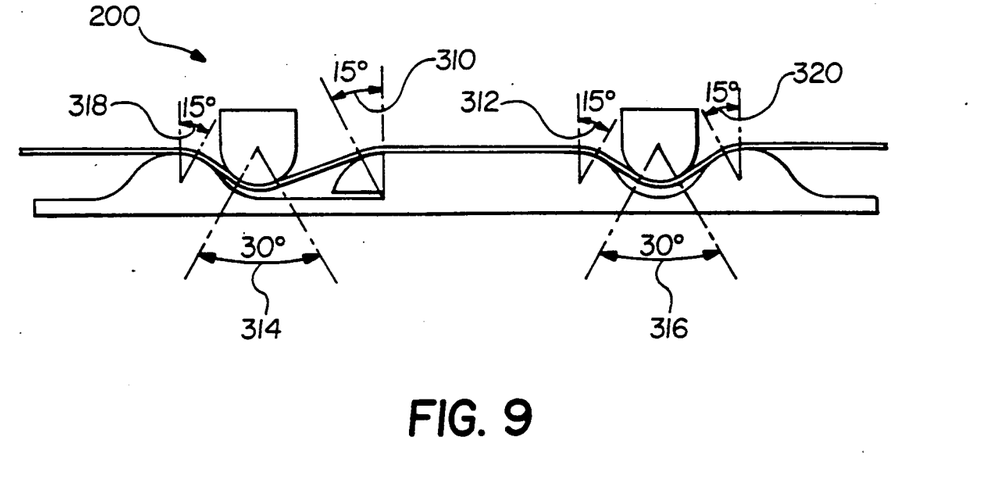

As shown in FIG. 9, curved surface defining means 250 and 252 define curved surfaces 254 and 256 which contact film 212 over wrap angles 310 and 312, respectively, each of about 15° extending from the corresponding aperture edge. The first and second film deflector means 270 and 272 define curved surfaces 274 and 290, respectively, which contact film 212 over wrap angles 314 and 316, respectively, each of about 30°. Body portions 280 and 296 define curved surfaces 282 and 298, respectively which contact film 212 over wrap angles 318 and 320, respectively, each of about 15°. Thus, film 212 is exposed to a total wrap angle of 120° as it travels along the respective path defined between the surfaces 284 and 300.

As film 212 moves along through apparatus 200 from left to right as viewed in the drawing, wrap angle 318 is an initial wrap angle and wrap angle 314 is a deflecting wrap angle which provides lateral column strength in film 212 for edge guiding. Wrap angle 310 is a transition wrap angle which provides lateral column strength in film 212 for one side of the clamped region including flat surface 232 and aperture 234. Longitudinal edge flattening force is applied to film 212 while in the clamped region in a manner similar to that of the previous embodiment and this will be described subsequently. Film 212 is provided with both lateral column strength and longitudinal flatness thereby resulting in flatness in the entire region of interest. Wrap angle 312 is a leaving wrap angle which provides lateral column strength in film 212 for the other side of the clamped region of interest. Wrap angle 316 is a deflecting wrap angle and wrap angle 320 is a final wrap angle, these latter two wrap angles serving as means for applying tension to film 212 travelling along the serpentine path defined in apparatus 200.

Figure 10:
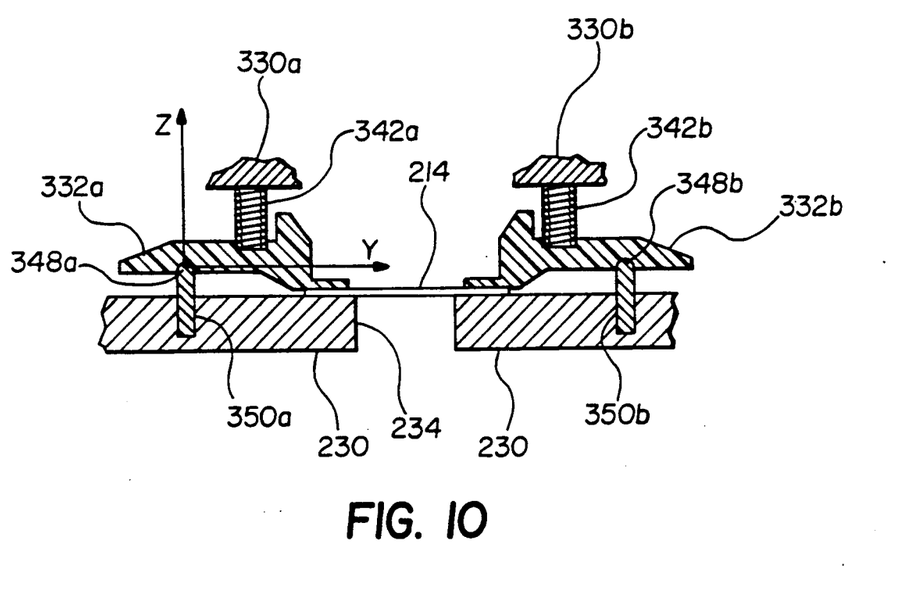
FIG. 10 is a fragmentary diagrammatic sectional view further illustrating the force applying means.

The apparatus 200 further comprises means 330a, 330b substantially near the aperture longitudinal edges 240, 242 for applying edge flattening force to the edges of film 212 outwardly of the aperture longitudinal edges in a manner similar to that of the embodiment of FIGS. 1-3. In this connection, force applying means 330a, 330b shown in FIGS. 7 and 10 are substantially similar to force applying means 80a, 80b of the embodiment of FIGS. 1-3. Each force applying means, for example means 330a shown in FIG. 7, comprises a flattener element 332 having a main body portion 334, a depending flange portion 336 and a foot portion 338 extending from flange portion 336. Foot portion 338 is disposed substantially parallel to surface 232 and is adapted to contact film 212 at the location described above and apply longitudinal flattening force thereto.

Figure 11:
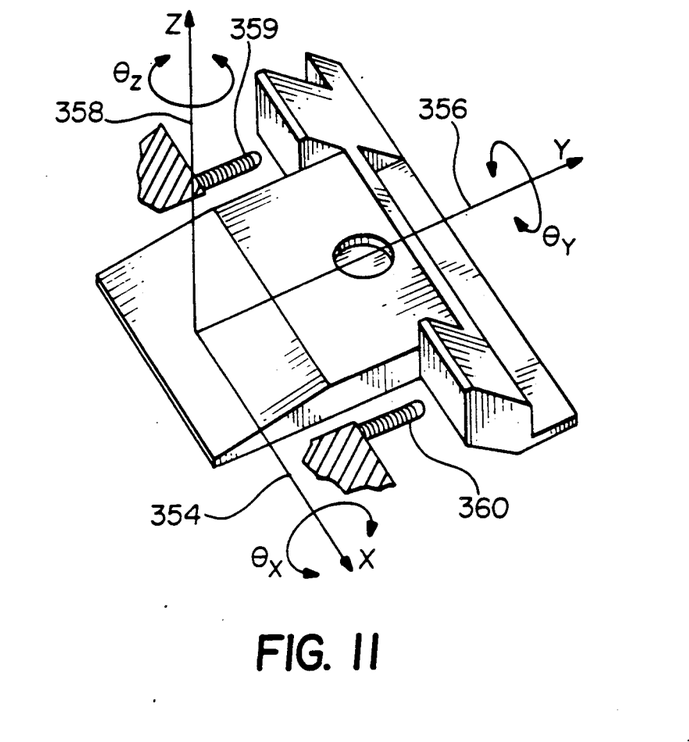
FIG. 11 is a fragmentary diagrammatic perspective view of a component of the force applying means illustrating operation thereof.

As shown in FIG. 10, force applying means 330a, 330b include compression springs 342a, 342b for applying continuous longitudinal edge flattening force to film 212. For use with standard 35 mm photographic film, springs 342a, 342b each apply a force of about eight ounces. Each force applying means 330a, 330b includes a universal mounting means similar to means 100 of the embodiment of FIGS. 1-3. As shown in FIG. 10, the mounting means comprises a countersink hole 348a, 348b in flattener element 332a, 332b and a spherical tip set screw 350a, 350b mounted in base 230. The resulting wobble or wave-like motion of each flattener element, for example element 332a, is illustrated in FIG. 11. This motion is about the axis designated 354, 356 in FIG. 11. Pivotal movement of the flattener about the third axis designated 358 is restrained by stop means in the form of screws 358, 360 on opposite sides of axis 358 fixed to base 230 or another appropriate structure for engaging the flattener. This prevents any movement of an edge of the flattener structure into the field of view of aperture 234.

The apparatus 200 further includes edge guide means 370a, 370b which function in a manner similar to edge guides 110a, 110b in the embodiment of FIGS. 1-3. Edge guide 370a is mounted for pivotal movement about an axis 372a in the vicinity of curved surface 254. Axis 372a is substantially perpendicular to surface 232. Edge guide 370a also is mounted for lateral movement toward and away from film edge 216 and is urged toward edge 216 by force applying means in the form of spring 374. In apparatus 200 used with standard 35 mm photographic film, spring 374 is a flat rate torsion spring supplying a constant loan of six ounces at the film edge. Edge guide 370b is mounted for pivotal movement about an axis 378 disposed substantially perpendicular to surface 232. Edge guide 370b is not mounted for lateral movement.

The operative surfaces 384a, 384b of edge guides 370a, 370b should have a dimension in the direction of film travel sufficient to prevent the edge guide from detenting into the film notches 224. In accordance with the present invention, it has been determined that this edge guide dimension should be at least about 2.5 times the width of film notch 224 measured along film edge 218.

Figure 12:
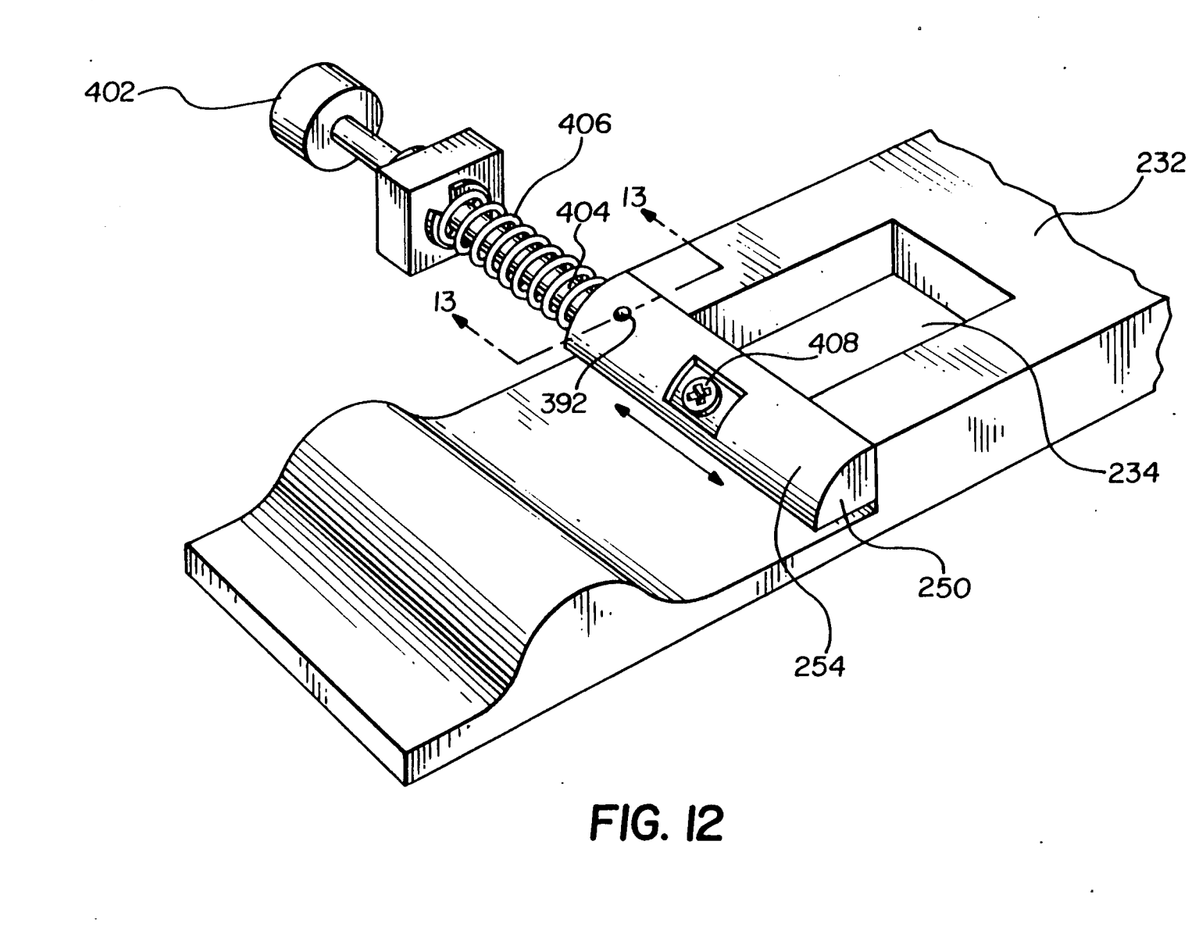
FIG. 12 is a fragmentary diagrammatic perspective view illustrating the optical film notch sensor.
Figure 13:
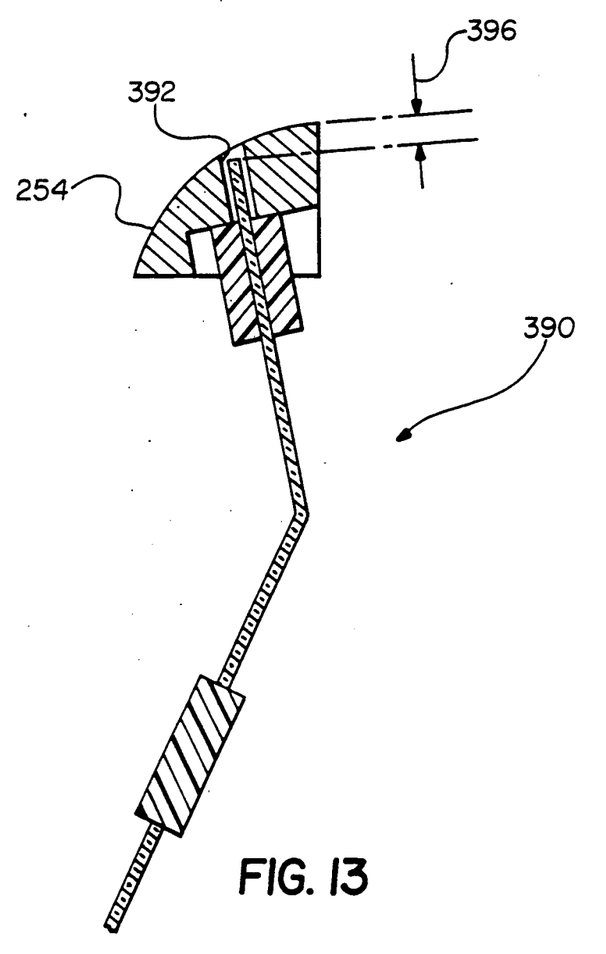
FIG. 13 is a sectional view taken about on line 13—13 in FIG. 12.

Referring now to FIGS. 12 and 13 the apparatus 200 uses an incandescent reflective coaxial fiber optic sensor 390 to detect film notches. The sensor is located in a hole 392, beneath the radiused surface 254 immediately before the aperture 234. The sensor is fixtured the distance of its focal length, designated 396 in FIG. 13, beneath the radiused surface 254. When film web 214 is under tension in the apparatus 200, the bottom surface of the film web is forced to be in intimate contact with the radiused surface 254 surrounding the sensor hole 392. The (15) degree web contact angle will ensure that the film web is repeatedly registered at the sensor focal length distance. The radiused surface 254 immediately before the aperture is defined by the separate component 250 which is adjusted by a thumb knob 402 operated lead screw 404 adjustment mechanism. This adjustable aperture component is spring loaded with a compression spring 4060 to locate it laterally, and is nested against the remaining fixed aperture 232 with a machine screw 408.

The apparatus 200 of this embodiment has all the advantages of the embodiment of FIGS. 1-3. In addition, it is particularly advantageous in photofinishing apparatus wherein the film enters and leaves along paths disposed in substantially the same plane as that of the exposure aperture. The total minimum film web contact wrap angle of 120° through the serpentine path of apparatus 200 allows for reliable film column strength at the lateral edge guides along with maximized film flatness at the aperture 234.

It is therefore apparent that the present invention accomplishes its intended objects. While embodiments of the present invention have been described in detail, that is for the purpose of illustration, not limitation.

I claim:

1. Film flattening apparatus comprising:
    a) a base having a flat surface adapted to contact film as it moves therealong in a given direction;
    b) an aperture defined in said base open to said flat surface and having spaced apart lateral edges disposed substantially perpendicular to said direction and spaced apart longitudinal edges joining said lateral edges and disposed substantially parallel to said direction to allow respective opposite edges of said film to lie outwardly of said aperture longitudinal edges;
    c) respective means in the vicinity of said aperture lateral edges for defining film contacting surfaces each having curvature sufficient to provide lateral column strength in the film as it is moved thereover in said direction; and
    d) means substantially near said aperture longitudinal edges for applying edge flattening force to the edges of the film outwardly of said aperture longitudinal edges.

2. Apparatus according to claim 1, wherein said means defining film contacting surfaces comprises:
    a) first means adjacent one of said aperture lateral edges for defining a curved surface defined by a radius in a plane parallel to said film direction;
    b) second means adjacent the other of said aperture lateral edges for defining a curved surface defined by a radius in a plane parallel to said film direction; and
    c) each of said radii being of a length sufficient to maximize lateral film flatness while minimizing longitudinal film bow.

3. Apparatus according to claim 2, wherein said first means defines a curved surface which contacts said film over an angle of about 30° extending from said one aperture lateral edge and wherein said second means defines a curved surface which contacts said film over an angle of about 15° extending from the other of said aperture lateral edges.

4. Apparatus according to claim 3 further including edge guide means for contacting opposite edges of said film in the vicinity of said first curved surface defining means.

5. Apparatus according to claim 3, further including optical film notch detecting means operatively associated with said first curved surface defining means.

6. Apparatus according to claim 1, wherein said aperture is a film exposure aperture in photofinishing apparatus.

7. Apparatus according to claim 1, wherein said means for applying flattening force comprises:
    a) means for contacting said film at laterally opposite locations adjacent the edges of said film and outwardly of said aperture longitudinal edges;
    b) means for applying film flattening force to said film contacting means; and
    c) means for mounting said film contacting means for limited movement in two directions about axes substantially parallel to and perpendicular to the direction of movement of said film to accommodate variations in thickness of said film.

8. Film flattening apparatus comprising:
    a) a base having a flat surface adapted to contact film as it moves therealong in a given direction;
    b) an aperture defined in said base open to said flat surface and having spaced apart lateral edges disposed substantially perpendicular to said direction and spaced apart longitudinal edges joining said lateral edges and disposed substantially parallel to said direction to allow respective opposite edges of said film to lie outwardly of said aperture longitudinal edges;

c) first means in the vicinity of one of said aperture lateral edges for defining a film contacting surface having curvature sufficient to provide lateral column strength in the film as it is moved thereover in said direction;

d) second means in the vicinity of the other of said aperture lateral edges for defining a film contacting surface having curvature sufficient to provide lateral column strength in the film as it is moved thereover in said direction;

e) means substantially near said aperture longitudinal edges for applying edge flattening force to the edges of the film outwardly of said aperture longitudinal edges;

f) first film deflector means adjacent said first curved surface defining means for deflecting film along a serpentine path from a location spaced from said aperture along said curved surface and along said flat surface; and g) second film deflector means adjacent said second curved surface defining means for deflecting film along a serpentine path from a location spaced from said aperture along said curved surface and along said flat surface.

9. Apparatus according to claim 8, wherein each of said first and second curved surface defining means defines a curved surface defined by a radius in a plane parallel to said film direction, each of said radii being of a length sufficient to maximize lateral film flatness while minimizing longitudinal film bow.

10. Apparatus according to claim 9, wherein each of said first and second curved surface defining means defines a curved surface which contacts said film over an angle of about 15° extending from the corresponding aperture edge and wherein each of said first and second film deflector means defines a curved surface which contacts said film over an angle of about 30°.

11. Apparatus according to claim 10, further including third and fourth curved surface defining means located outwardly of said first and second deflector means, respectively, in a direction away from the corresponding one of said aperture lateral edges, each of said third and fourth means defining a film contacting surface defined by a radius in a plane parallel to said film direction.

12. Apparatus according to claim 11, wherein each of said third and fourth curved surface defining means defines a curved surface which contacts said film over an angle of about 15°.

13. Apparatus according to claim 8, wherein said means for applying flattening force comprises:

a) means for contacting said film at laterally opposite locations adjacent the edges of said film and outwardly of said aperture longitudinal edges;

b) means for applying film flattening force to said film flattening means; and c) means for mounting said film contacting means for limited movement in two directions about axes substantially parallel to and perpendicular to the direction of movement of said film to accommodate variations in thickness of said film.

14. Apparatus according to claim 8, further including edge guide means for contacting opposite edges of said film in the vicinity of one of said curved surface defining means.

15. Apparatus according to claim 14, further including optical film notch detecting means operatively associated with said one of said curved surface defining means in the vicinity of said edge guide means.

16. Apparatus according to claim 8, wherein said aperture is a film exposure aperture in photofinishing apparatus.

17. Apparatus for handling film in the form of a web having spaced substantially parallel longitudinal edges and provided with notches at spaced locations along at least one of said edges, said apparatus comprising:

a) a base having a flat surface adapted to contact film as it moves therealong in a given direction;

b) an aperture defined in said base open to said surface and having a lateral edge disposed substantially perpendicular to said direction;

c) film flattening means operatively associated with said aperture and said flat surface, said film flattening means including means associated with said aperture lateral edge for defining a curved film contacting surface defined by a radius disposed in a plane substantially parallel to the direction of movement of said film; and d) optical film notch detecting means operatively associated with said curved surface defining means for sensing said notches at a location where said film is in contact with said curved surface.

18. Apparatus according to claim 17, wherein said notch detecting means comprises:

a) an aperture in said surface at a location to be in registry with said notches as said film moves along said curved surface; and b) optical means in said aperture for detecting said notches.

19. Apparatus according to claim 18, further including means for adjusting said curved surface defining means in a lateral direction to adjust the degree of registry between said notches and said detecting.

20. Apparatus for handling film in the form of a web having spaced substantially parallel longitudinal edges and provided with notches at spaced locations along at least one of said edges, said apparatus comprising:

a) a base having a flat surface adapted to contact film as it moves therealong in a given direction;

b) an aperture defined in said base open to said surface and having spaced apart lateral edges disposed substantially perpendicular to said direction and spaced apart longitudinal edges and disposed substantially parallel to said direction;

c) film flattening means operatively associated with said aperture and said flat surface, said film flattening means providing lateral column strength in the film and applying longitudinal edge flattening force to the edges of the film outwardly of said apertures longitudinal edges; and d) edge guide means having operative surfaces for contacting opposite edges of said film, the operative surface of said edge guide means contacting the film edge containing said notches having a dimension in the direction of movement of said film greater than the dimension of a notch measured along the film edge.

21. Apparatus according to claim 20, wherein said edge guide dimension is at least about 2.5 times said notch dimension.

22. Apparatus according to claim 20, further including flat rate torsion spring means operatively associated with said edge guide means for applying constant force to said film edges.

23. Film flattening apparatus comprising:

a) a base having a flat surface adapted to contact film as it moves therealong in a given direction;
b) an aperture defined in said base open to said flat surface and having spaced apart lateral edges disposed substantially perpendicular to said direction and spaced apart longitudinal edges joining said lateral edges and disposed substantially parallel to said direction to follow respective opposite edges of said film to lie outwardly of said aperture longitudinal edges;
c) means in the vicinity of said aperture lateral edges for contacting said film in a manner providing lateral column strength in the film so that lateral film flatness is maximized while longitudinal film bow is minimized; and
d) means near said aperture longitudinal edges for applying edge flattening force to the edges of the film outwardly of the aperture longitudinal edges, said flattening force applying means comprising means for contacting said film at laterally opposite locations adjacent the edges of said film and outwardly of said aperture longitudinal edges, means for applying film flattening force to said film contacting means, and for mounting said film contacting means for limited movement in two directions about axes substantially parallel to and substantially perpendicular to the direction of movement of said film to accommodate variations in thickness of said film.

24. Apparatus according to claim 23, wherein said means for applying film flattening force to said film contacting means comprises compression spring means having one end contacting said film contacting means and the opposite end thereof contacting a fixed support, said compression spring means accommodating variations in thickness of said film.

25. Apparatus according to claim 23, wherein said means for mounting said film contacting means also allows movement thereof in a third direction about an axis substantially perpendicular to said surface.

26. Apparatus according to claim 25, further including means for limiting the degree of movement of said film contacting means in said third direction.

27. A method of flatening film as it moves in a given direction along a flat surface having an aperture therein defined by spaced apart lateral edges disposed substantially perpendicular to said direction and spaced apart longitudinal edges joining said lateral edges and disposed substantially parallel to said direction, said method comprising the steps of:
a) bending said film in the vicinity of said aperture lateral edges and outwardly of said flat surface in a manner providing lateral column strength in said film; and
b) applying edge flattening force to the edges of said film on said flat surface and outwardly of said aperture longitudinal edges.

28. The method according to claim 27, wherein said step of bending said film comprises moving said film along and in contact with curved surfaces defined near said aperture lateral edges, said surfaces being defined by radii disposed in a plane substantially parallel to the direction of movement of said film.

29. The method according to claim 27, wherein said step of bending said film comprises:
a) moving said film along and in contact with a curved surface which contacts said film over an angle of about 30° extending from one aperture lateral edge; and
b) moving said film along and in contact with a curved surface which contacts said film over an angle of about 15° extending from the other of the aperture lateral edges.

30. A method of handling film as it moves in a given direction along a flat surface having an aperture defined therein, said film being in the form of a web having spaced substantially parallel longitudinal edges and provided with notches at spaced locations along at least one of said edges, said method comprising the steps of:
a) moving said film along and in contact with a curved surface prior to moving along said flat surface, said curved surface being defined by a radius disposed in a plane substantially parallel to the direction of movement of said film; and
b) optically detecting said notch while said film is in contact with said curved surface 31. A method according to claim 30, wherein said step of detecting comprises:
a) moving said film along said surface so that said one edge is in alignment with an aperture in said curved surface; and
b) optically sensing a notch when in registry with said aperture.

32. A method of flattening film as it moves in a given direction along a flat surface having an aperture therein defined by spaced apart lateral edges disposed substantially perpendicular to said direction and spaced apart longitudinal edges joining said lateral edges and disposed substantially parallel to said direction, said method comprising the steps of:
a) deflecting said film along a serpentine path from a location spaced from said aperture and spaced from one of said aperture lateral edges, said serpentine path leading to said flat surface;
b) bending said film in the vicinity of said aperture lateral edges and outwardly of said flat surface in a manner providing lateral column strength in said film;
c) applying edge flattening force to the edges of said film on said flat surface outwardly of said aperture longitudinal edges; and
d) deflecting said film along a serpentine path leading from said flat surface to a location spaced from said aperture and spaced from the other of said aperture lateral edges.

33. The method according to claim 32, wherein said step of bending said film comprises moving said film along and in contact with curved surfaces defined adjacent said aperture lateral edges and wherein said steps of deflecting said film each comprises moving said film along and in contact with a curved deflecting surface, said surfaces being defined by radii disposed in a plane substantially parallel to the direction of movement of said film.

34. The method according to claim 33 wherein said steps of bending and deflecting said film comprise:
a) moving said film along and in contact with a first curved deflecting surface which contacts said film over an angle of about 30°.
b) moving said film along and in contact with first and second curved surfaces each of which contacts said film over an angle of about 15° extending from the corresponding one of said aperture lateral edges; and c) moving said film along and in contact with second curved deflecting surface which contacts said film over an angle of about 30°.

35. The method according to claim 34, further comprising:
a) moving said film along and in contact with a third curved surface prior to moving said film along and in contact with said first deflecting surface; and
b) moving said film along and in contact with a fourth curved surface after moving said film along and in contact with said second deflecting surface;
c) said third and fourth curved surfaces being defined by radii disposed in a plane substantially parallel to the direction of movement of said film.

36. The method according to claim 35, wherein said steps of moving said film over said third and fourth curved surfaces are each over an angle of about 15°.

* * * * *